Sept. 6, 1955 A. L. DE BONVILLE ET AL 2,716,834
BAIT BUCKET
Filed May 26, 1953 2 Sheets-Sheet 2
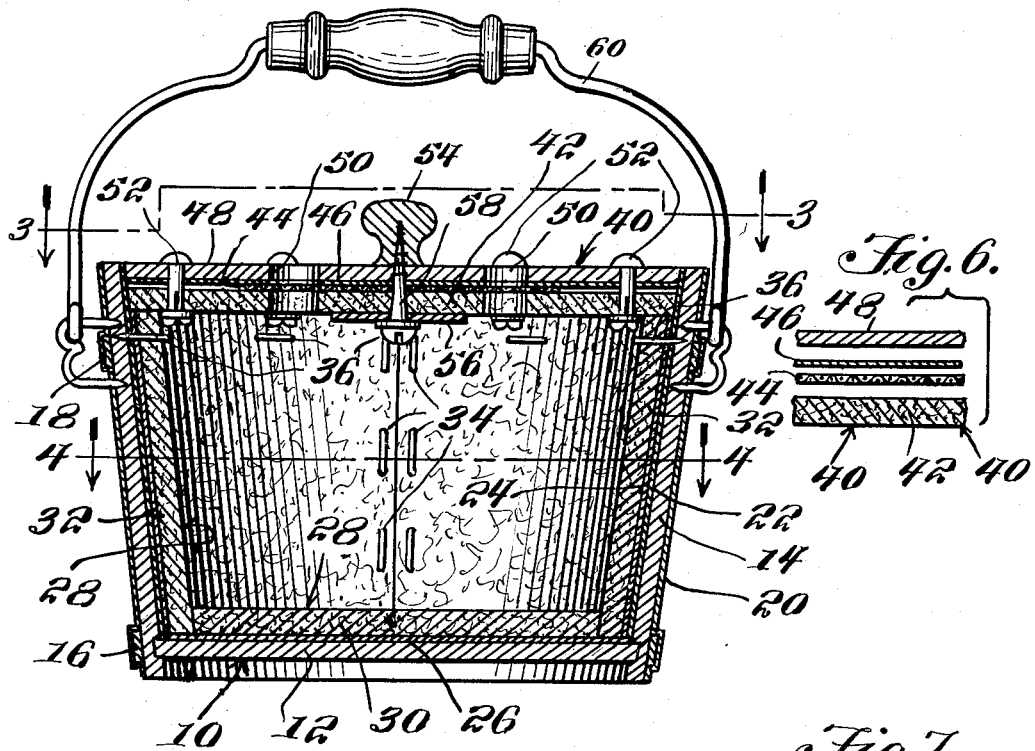
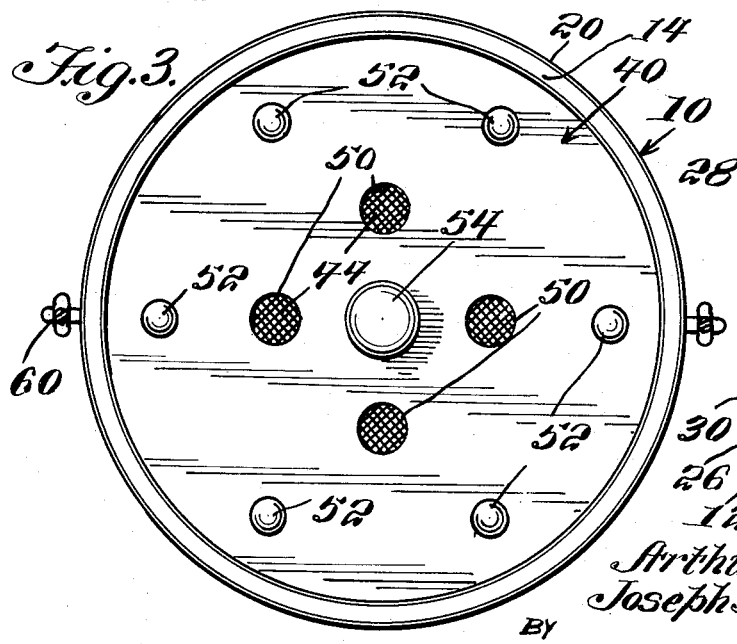
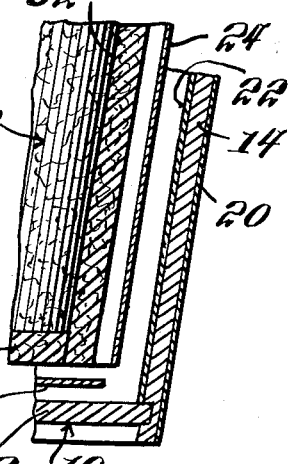
INVENTOR.
Arthur L. DeBonville,
Joseph S. Swercewski,
BY
McMorrow, Berman & Davidson
Attorneys

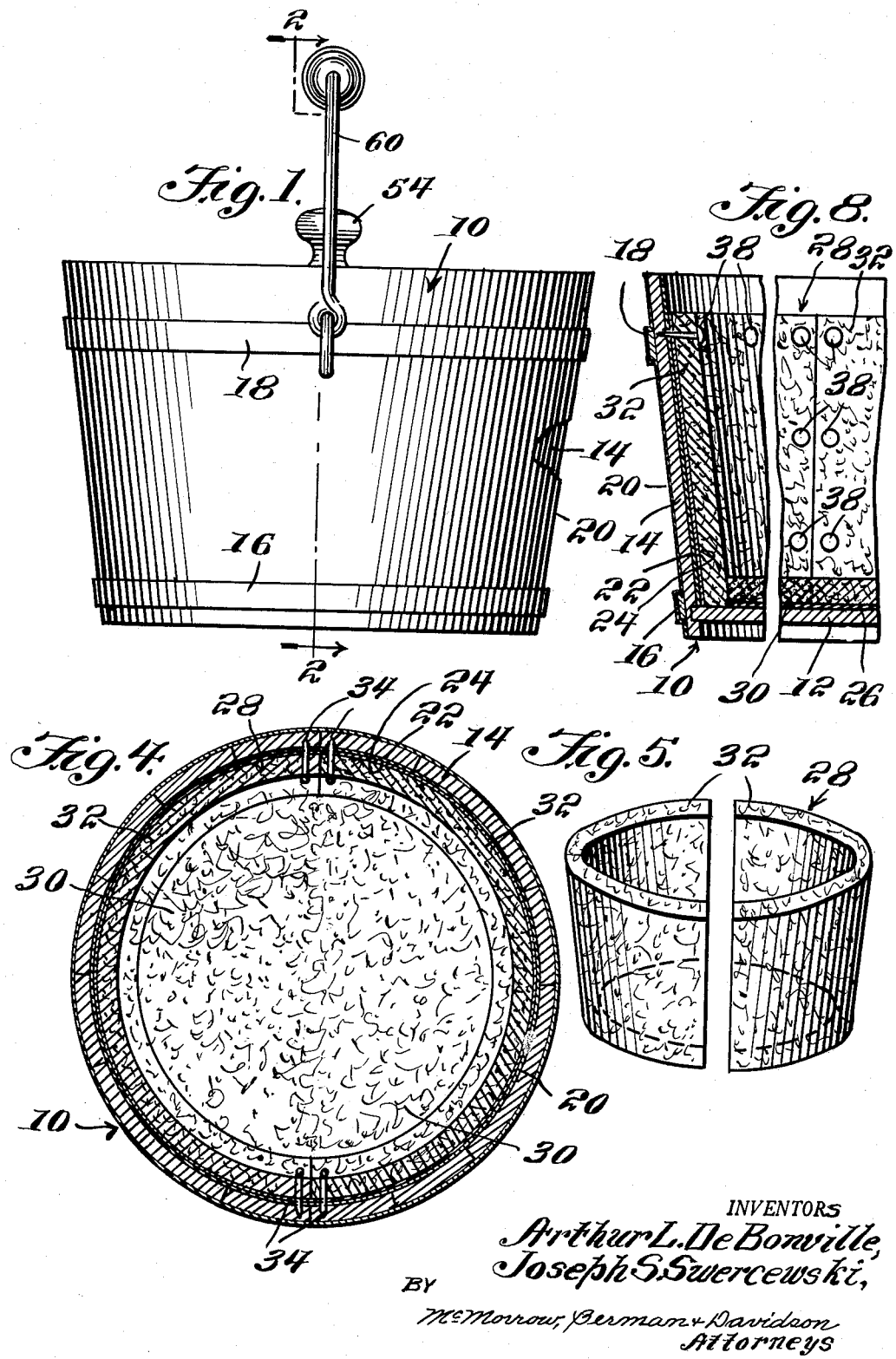

United States Patent Office 2,716,834
Patented Sept. 6, 1955

2,716,834
BAIT BUCKET

Arthur L. De Bonville, Fitchburg, and Joseph S. Swercewski, Gardner, Mass.

Application May 26, 1953, Serial No. 357,512

2 Claims. (Cl. 43—55)

This invention relates to bait buckets, and more particularly, has reference to a bait bucket or container that is especially adapted for holding earthworms, night crawlers, but which is equally well adapted for holding such other types of live bait as crawfish, minnows, and other aquatic animals.

Certain types of live bait must be maintained in a cool, moist environment, if they are to be kept alive and active. For example, the large northern night crawler is one type of live bait which is very difficult to maintain, during the hot summer months, this type of bait being unable to survive temperatures above seventy degrees Fahrenheit for any length of time. Other types of bait, such as common earthworms, must also be maintained in a cool, moist condition since they breathe in oxygen by absorption of moisture through the skin.

In view of the above, the main object of the present invention is to provide a bait bucket which will be particularly designed to maintain the bait at a desirably low temperature, and in a moist condition, for long periods of time.

Another object is to provide a bait bucket as described which, though discharging efficiently its intended function of maintaining bait in a cool, moist environment for long periods of time, will still be capable of manufacture at a minimum of cost.

Other objects will appear from the following description, the claims appended thereto, and from the annexed drawings, in which like reference characters designate like parts throughout the several views, and wherein:

Figure 1 is a side elevational view of our bait bucket;

Figure 2 is a sectional view on line 2—2 of Figure 1;

Figure 3 is a plan sectional view on line 3—3 of Figure 2;

Figure 4 is a sectional view on line 4—4 of Figure 2;

Figure 5 is a reduced, exploded perspective view of the side wall of the inner shell;

Figure 6 is an enlarged, exploded, sectional view showing the details of the cover construction;

Figure 7 is a view similar to Figure 6, showing the details of the construction of the body of the bait bucket; and Figure 8 is a fragmentary, vertical sectional view showing a modified construction.

An outer shell, designated generally by the reference numeral 10, is preferably formed of wood material, and has a flat, circular bottom 12 fixedly secured to the lower end of a tapered side wall 14. The side wall 14 is also, in a preferred embodiment of the invention, formed of wood material, and can be fashioned from a plurality of wood staves (see Figure 4). Hoops 16, 18 extend circumferentially of the side wall, at the bottom and upper ends thereof, respectively. The outer shell, considered per se, is basically conventional in construction, but in accordance with the present invention, the outer surface of the side wall 14 is coated with aluminum or other reflective paint as at 20.

Further, in accordance with the present invention, the inner surface of side wall 14 is coated, throughout its area, with paraffin wax as at 22, for the purpose of preventing moisture contained within the bucket from escaping through the wooden outer shell. At the same time, the wax water-proofs the bucket.

The aluminum paint, in this connection, is used as an insulating means, to reflect heat rays and thereby maintain the temperature within the bucket at a desirably low level.

Lining the interior of the outer shell side wall is aluminum foil 24. Aluminum foil 26 lines the bottom of the outer shell, the foil 24 and 26 serving a three-fold purpose. Said foil will, first, serve as an insulation material, that will reflect heat rays that might penetrate the wooden outer shell. Second, the foil will retard a rapid evaporation of moisture maintained within the bucket interiorly of the foil liner. Third, the foil is used because of its low cost and its lightness in weight, as an insulation with a dual action preventing heat transfer directly between the wooden outer shell and the inner shell to be described hereinafter.

The inner shell has been designated generally at 28, and is formed throughout of comparatively thick, highly porous material having a high rate of moisture absorption. Molded wood fiber has been found well suited, in this regard.

The inner shell has a circular bottom 30 overlying the bottom foil portion 26, the periphery of the bottom 30 being engaged against the lower edges of a pair of complementary halves or side wall sections 32, each of which is of semi-circular cross section and is flared complementarily to the flare of the outer shell.

The sections 32 are fixedly secured to the outer shell, after being positioned in the manner shown in Figure 2, by means of staples 34, 36. The staples 34 are arranged in pairs, at opposite sides of the seams defined by the contacting side edges of the sections 32. Staples 36 are spaced circumferentially of the upper end of the inner shell.

In Figure 8 there is shown a modified form, wherein aluminum nails 38 are used instead of staples 34, 36.

A lid has been designated generally at 40, and is of laminated formation, said lid including a bottom lamination 42 formed of molded wood fiber. A plastic screen overlies the bottom lamination and has been designated by the reference numeral 44, and overlying the screen is a foil lamination 46, aluminum foil being preferably used. A top lamination has been designated by the reference numeral 48, and can be formed of "Masonite" or other non-porous composition material.

The several laminations are formed with registering openings, with the exception of the screen, the screen extending across said registering openings as shown in Figure 3. The registering openings of the several laminations define air vents 50, whereby the interior of the bucket will be vented to atmosphere.

Rivets 52, which can be conventional tubular or split rivets, extend through the cover laminations, to fixedly connect the same together.

To facilitate the removal or application of the cover, a centrally disposed, upstanding knob 54 is provided. A washer 56 underlies the center area of the bottom lamination, a screw 58 extending through said washer and being threadedly engaged with the knob to secure the knob fixedly to the cover.

A bail 60 can be connected to the body portion of the bucket, to facilitate carrying of the same.

In use of the invention, and assuming that the bucket is to be used for holding night crawlers or earthworms, the bucket would first be filled with cool water for a period of perhaps twelve to twenty-four hours. The purpose of filling the bucket with water is to cause the porous wood fiber inner shell to absorb a maximum amount of water, until it has reached the saturation point.

Meanwhile, peat moss, which would generally be used for packing and holding the worms, will have been soaked thoroughly for a period of perhaps six to twelve hours in cool water, before use. Excess water is then squeezed out of the peat moss, and the peat moss is packed into the container with the live earthworms or night crawlers. Of course, the water previously deposited in the container will have been removed before the peat moss is inserted. The container would be filled with peat moss to a level perhaps one inch, more or less, below the cover.

By reason of the construction illustrated and described, the temperature of the peat moss would be kept at a desirably low level, as for example sixty-five degrees Fahrenheit, for a substantial period of time. At the same time, the moisture content within the container or bucket is maintained throughout said substantial period of time, thus to keep the worms alive and healthy.

Both wood fiber and peat moss absorb moisture by capillary attraction, and it has been found that the peat moss, having a larger exposed surface, tends to dry out first. As it does, it draws reserve moisture from the saturated wood fiber material, the peat moss thus being kept damp for a long period of time.

The particular formation and relative arrangement of the parts of the device, and the particular materials used, are of importance. As will be noted, the wooden outer shell is itself adapted to provide a certain insulating function, and of course, the insulating value of the outer shell is increased measurably by the use of reflective paint on the exterior thereof, and the use of an aluminum foil liner. Further, the foil liner and the wax coating on the inner surface of the outer shell retain moisture within the interior of the device, the liner at the same time co-operating with the reflective paint to prevent the passage of heat rays inwardly of the device. Inwardly of the liner, the device is formed with a highly porous area, that is the contact surface against which the peat moss or other moistened packing is disposed, and it will be readily appreciated that this highly porous inner shell will, due to the construction illustrated and described, be kept very moist and cool, for a long period of time. It has been found that the arrangement maintains night crawlers, earthworms, and other forms of live bait, in a healthy condition for a long period of time, and the particular construction has facilitated the breeding of large northern night crawlers during the summer months, where said breeding and maintenance has heretofore proved very difficult.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A bait bucket comprising an outer shell including a bottom and a side wall extending upwardly therefrom, said shell being formed of a material of good insulative qualities, the side wall of said shell having a coating thereon throughout its area, over its outer surface, of a heat-reflective paint, and over its inner surface with a moisture-impervious material; an aluminum foil side wall liner overlying the moisture-impervious coating; a bottom liner of aluminum foil separate from said first-named liner overlying the inner surface of the bottom in peripheral contact with one end of the first-named liner; and an inner shell overlying said liners and formed of a material highly pervious to moisture.

2. A bait bucket comprising an outer shell including a bottom and a side wall extending upwardly therefrom, said shell being formed of a material of good insulative qualities, the side wall of said shell having a coating thereon throughout its area, over its outer surface, of a heat-reflective paint, and over its inner surface with a moisture-impervious material; an aluminum foil side wall liner overlying the moisture-impervious coating; a bottom liner of aluminum foil separate from said first-named liner overlying the inner surface of the bottom in peripheral contact with one end of the first-named liner; and an inner shell overlying said liners and formed of a material highly pervious to moisture, said inner shell including separately formed semi-cylindrical sections and a circular bottom member, said sections being abutted against one another along opposite sides thereof, and being secured to said outer shell side wall independently of one another.

References Cited in the file of this patent

UNITED STATES PATENTS

| | | |
|---|---|---|
| 778,648 | Fisher | Dec. 27, 1904 |
| 1,476,230 | Thompson | Dec. 4, 1923 |
| 1,709,424 | Zohe | Apr. 16, 1929 |
| 1,883,135 | Walker et al. | Oct. 18, 1932 |
| 1,942,756 | Howard | Jan. 9, 1943 |
| 2,328,993 | Norling | Sept. 7, 1943 |
| 2,432,042 | Richard | Dec. 2, 1947 |
| 2,613,472 | Ebert | Oct. 14, 1952 |

OTHER REFERENCES

T. C. Gregory: "Uses and Applications of Chemical and Related Products," page 28, published 1939 by Reinhold Publishing Corp., New York.